United States Patent [19]
Schick et al.

[11] Patent Number: 5,995,346
[45] Date of Patent: Nov. 30, 1999

[54] CARTRIDGE HAVING A PASSIVE SHUTTER OPENING MECHANISM

[75] Inventors: Brian Schick, San Diego; Douglas Mayne, Ramona, both of Calif.

[73] Assignee: Iomega Corporation, Roy, Utah

[21] Appl. No.: 09/022,342

[22] Filed: Feb. 11, 1998

[51] Int. Cl.⁶ .................................................. G11B 23/033
[52] U.S. Cl. ......................................................... 360/133
[58] Field of Search .............................. 360/133; 369/291

[56] References Cited

U.S. PATENT DOCUMENTS

| | | | |
|---|---|---|---|
| Re. 32,876 | 2/1989 | Wakabayashi et al. | 360/133 |
| 4,644,434 | 2/1987 | Oishi et al. | 360/133 |
| 4,652,961 | 3/1987 | Dieffenbach | 360/133 |
| 4,695,911 | 9/1987 | Loosen | 360/133 |
| 4,779,159 | 10/1988 | Champagne et al. | 360/133 |
| 4,879,616 | 11/1989 | Ando | 360/99.06 |
| 5,050,030 | 9/1991 | Nemoto et al. | 360/133 |
| 5,260,931 | 11/1993 | Sasaki et al. | 369/291 |
| 5,381,402 | 1/1995 | Lee et al. | 360/133 |
| 5,481,420 | 1/1996 | Cardona et al. | 360/133 |

FOREIGN PATENT DOCUMENTS

| | | |
|---|---|---|
| 0 077 566 A1 | 4/1983 | European Pat. Off. . |
| 0 174 111 A2 | 3/1986 | European Pat. Off. . |
| 37 29 241 | 3/1989 | Germany ........................ 360/133 |
| 58-147867 | 9/1983 | Japan ............................... 360/133 |
| 59-003756 | 1/1984 | Japan ............................... 360/133 |
| 2 161 642 | 1/1986 | United Kingdom . |
| 2 328 779 | 3/1999 | United Kingdom . |
| WO 86/06204 | 10/1986 | WIPO . |

*Primary Examiner*—Craig A. Renner
*Attorney, Agent, or Firm*—Woodcock Washburn Kurtz MacKiewicz & Norris LLP

[57] ABSTRACT

A disk cartridge has a passive shutter opening mechanism. The cartridge is adapted so that during insertion into a drive, the shutter is automatically opened. A projection is coupled to a shutter surface. The projection is sized so that it impinges on the front of the drive as the cartridge is inserted. This impingement causes the shutter to open and no levers are required to activate the shutter. The shutter also has a latch that operates to keep the shutter in the closed position. As the cartridge is inserted into the drive, the latch impinges on the drive opening causing the latch to release the shutter.

15 Claims, 9 Drawing Sheets

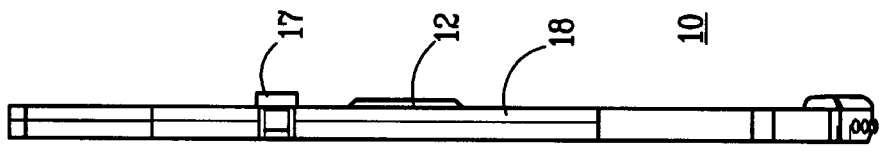
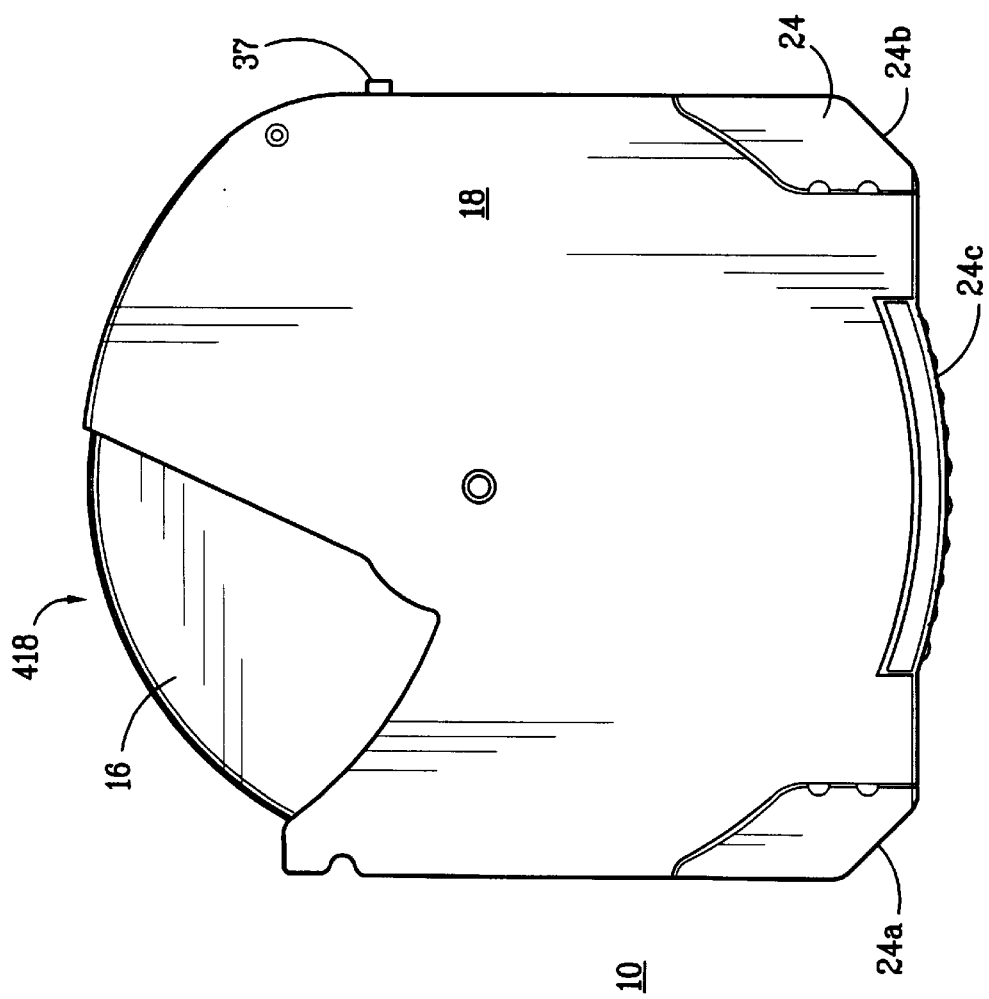

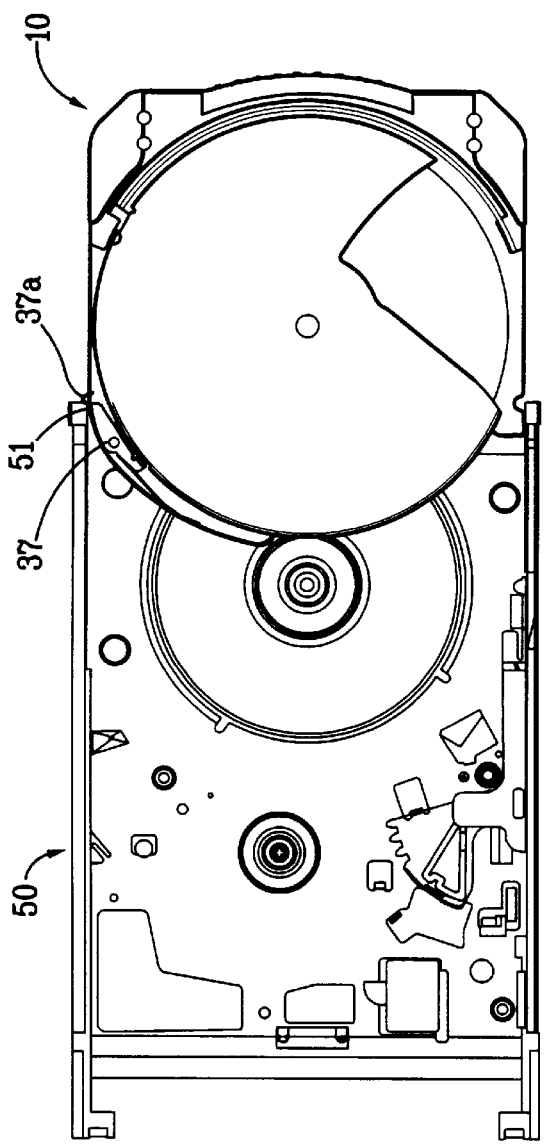
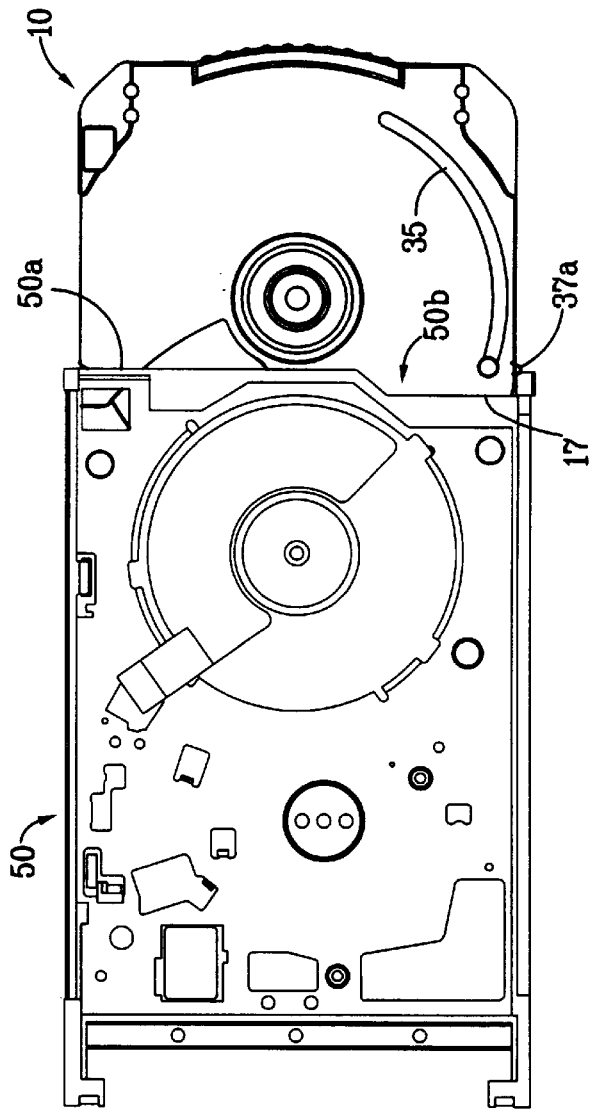

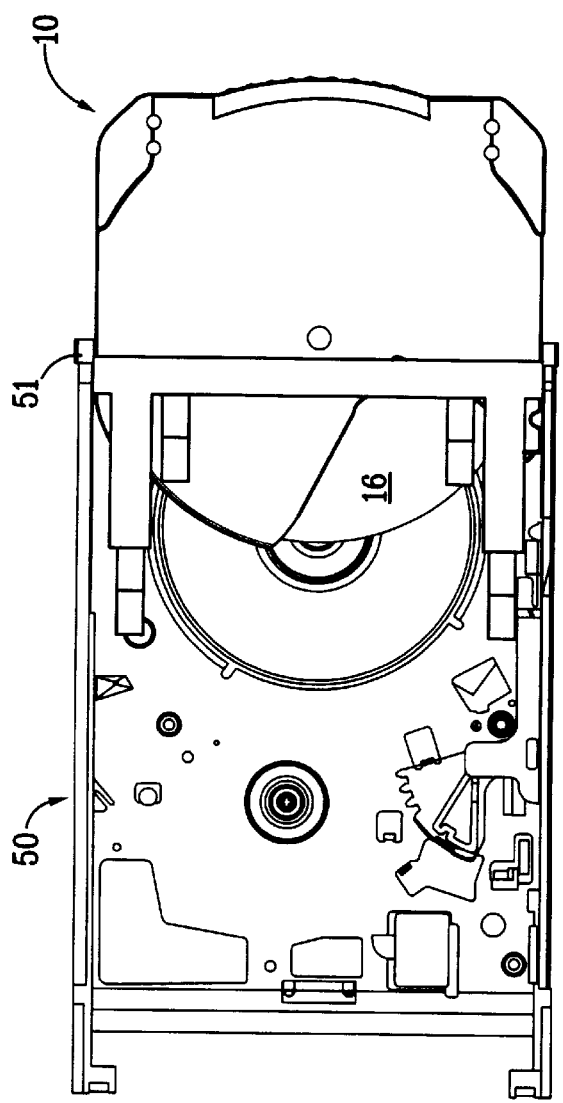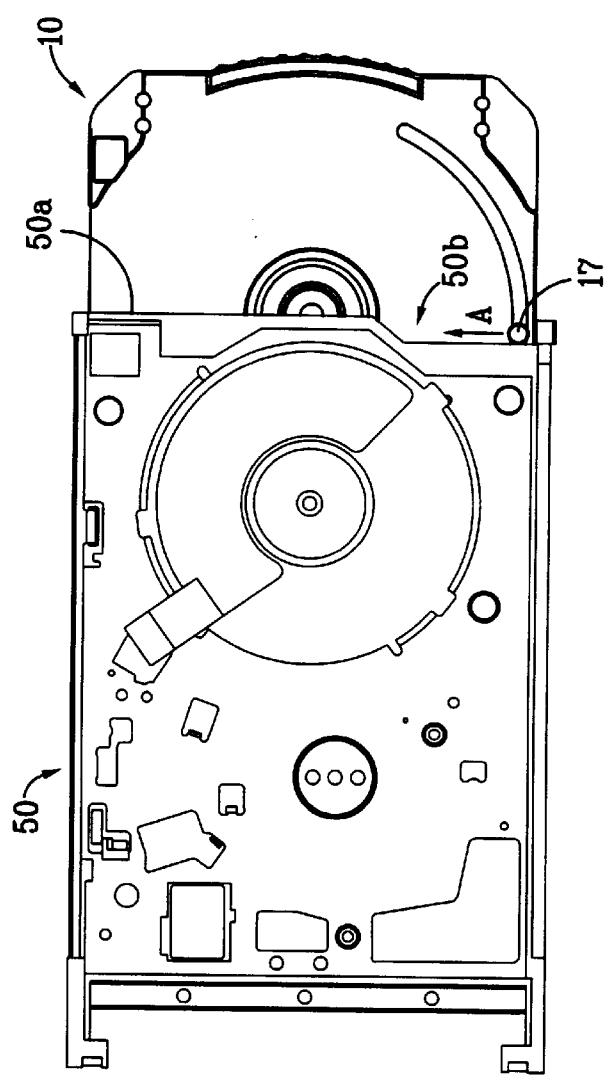
FIG. 8C
FIG. 8D

CARTRIDGE HAVING A PASSIVE SHUTTER OPENING MECHANISM

BACKGROUND OF THE INVENTION

This invention relates to a cartridge based data storage system in which a flexible magnetic disk is disposed within a cartridge shell. More particularly, the invention relates to a cartridge having a shutter, wherein the shutter is adapted to open during insertion of the cartridge into a disk drive.

Microprocessors and supporting computer technologies are rapidly increasing in speed and computing power while decreasing in cost and size. These factors have led to the broad application of microprocessors to an array of electronic products, such as hand-held computers, digital cameras, cellular phones and the like. All of these devices have, in effect, become computers with particular application-specific attributes. For this new breed of computer products, enormous flexibility is gained by the ability to exchange data files and store computer software.

A variety of proprietary storage devices have been used in computer products. For example, hand-held computers have used integrated circuit memory cards ("memory cards") as the primary information storage media. Memory cards include memory storage elements, such as static random access memory (SRAM), or programmable and erasable non-volatile memory, such as "flash" memory. Memory cards each are typically the size of a conventional credit card and are used in portable computers in place of hard disk drives and floppy disk drives. Furthermore, memory cards enhance the significant advantages of the size, weight, and battery lifetime attributes of the portable computer and increase portability of the storage media. However, because of the limited memory density attainable in each memory card and the high cost of the specialized memory chips, using memory cards in hand-held computers imposes limitations not encountered in less portable computers, which typically use more power-consuming and heavier hard and floppy disk drives as their primary storage media.

Typical removable disk cartridges have a flexible magnetic disk disposed within a hard outer shell. A movable shutter is connected to the shell and selectively opens to expose the flexible magnetic disk. Such a cartridge is disclosed in U.S. Pat. No. Re, 32,876 (Wakabayashi et al.). The Wakabayashi patent is directed to a disk cassette that contains a flexible magnetic disk for storing information. The disk cassette comprises a flexible disk attached to a hub. The disk and hub assembly are sandwiched between an upper cover and a lower cover. The Wakabayashi shutter rotates on the interior of the cartridge and comprises a metal sheet that slides over a disk access opening to cover a head access opening.

A shutter and corresponding shutter opening mechanism are described in co-pending U.S. patent application Ser. No. 08/968,225, which is assigned to the same assignee as the present invention. Therein, a shutter mechanism is described that has radially extending tab that mates with a rotary shutter opening lever. As a cartridge is inserted into a drive, a hook-like shutter lever end engages the shutter tab and rotates the shutter open.

Prior art shutter opening mechanisms require levers and other complicated mechanisms to open a cartridge shutter. The complicated mechanism require several moving parts that could fail to operate consistently and thereby degrade the overall reliability and performance of the storage system. Accordingly, there is a need for a cartridge having an improved shutter opening mechanism.

SUMMARY OF THE INVENTION

The present invention is directed to a disk cartridge for use in a disk drive. The cartridge comprises an outer shell having top and bottom portions. The bottom portion has a substantially circular center opening therethrough. The cartridge further comprises a flexible disk disposed within the outer shell. A shutter is coupled to the outer shell and moves between a first (closed) position and a second (open) position. A projection is coupled to the shutter and is adapted to impinge upon a portion of the disk drive during insertion of a cartridge therein so that the shutter moves from the first position to the second position during insertion of the cartridge into the disk drive.

The cartridge further comprises a latch means to prevent the shutter from moving unless said latch is released. When the cartridge is not inserted in the drive, the latch prevents accidental opening of the cartridge shell. By contrast, when the cartridge is inserted into the drive, the latch is disengaged by impingement of a portion of the latch on the drive opening.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 3 is a top plan view of the cartridge of FIG. 2;

FIG. 5 is a side elevation view of the cartridge of FIG. 2;

FIGS. 8A–8F illustrate the operation of shutter shell 16 in conjunction with the drive of FIG. 2;

DETAILED DESCRIPTION OF PREFERRED EMBODIMENT

The present invention provides a data storage cartridge for use with a removable media type of disk drive. Throughout the description, a preferred embodiment of the invention is described in connection with a particular sized and shaped disk cartridge. However, the disk cartridge dimensions and shape are presented for exemplary purposes only. Accordingly, the mechanism should not be limited to the particular cartridge embodiment shown as the invention contemplates the application to other cartridge and drive types and configurations.

Figure 1:
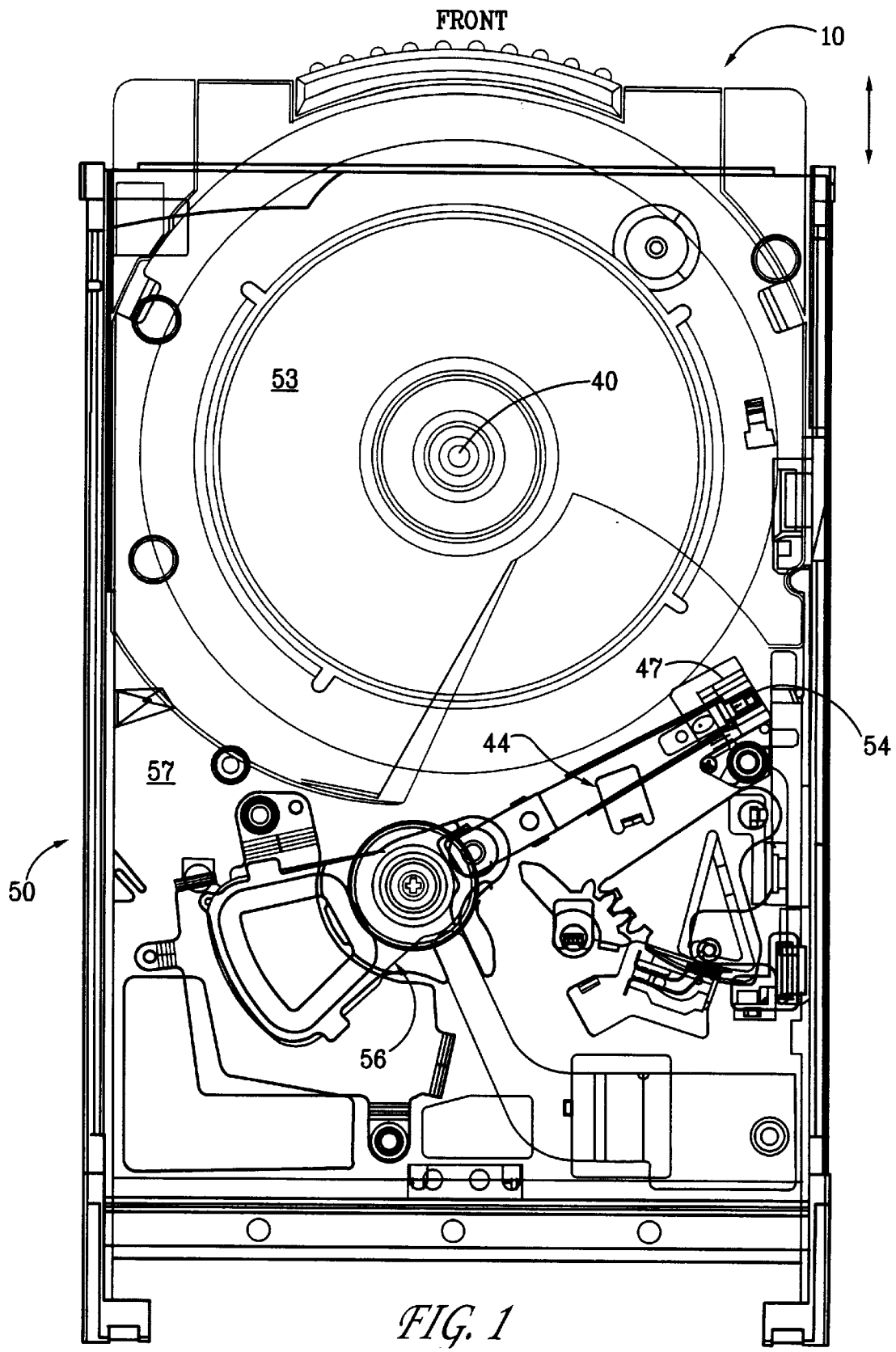
FIG. 1 is a top plan view of a disk drive according to the present invention.
Figure 2:
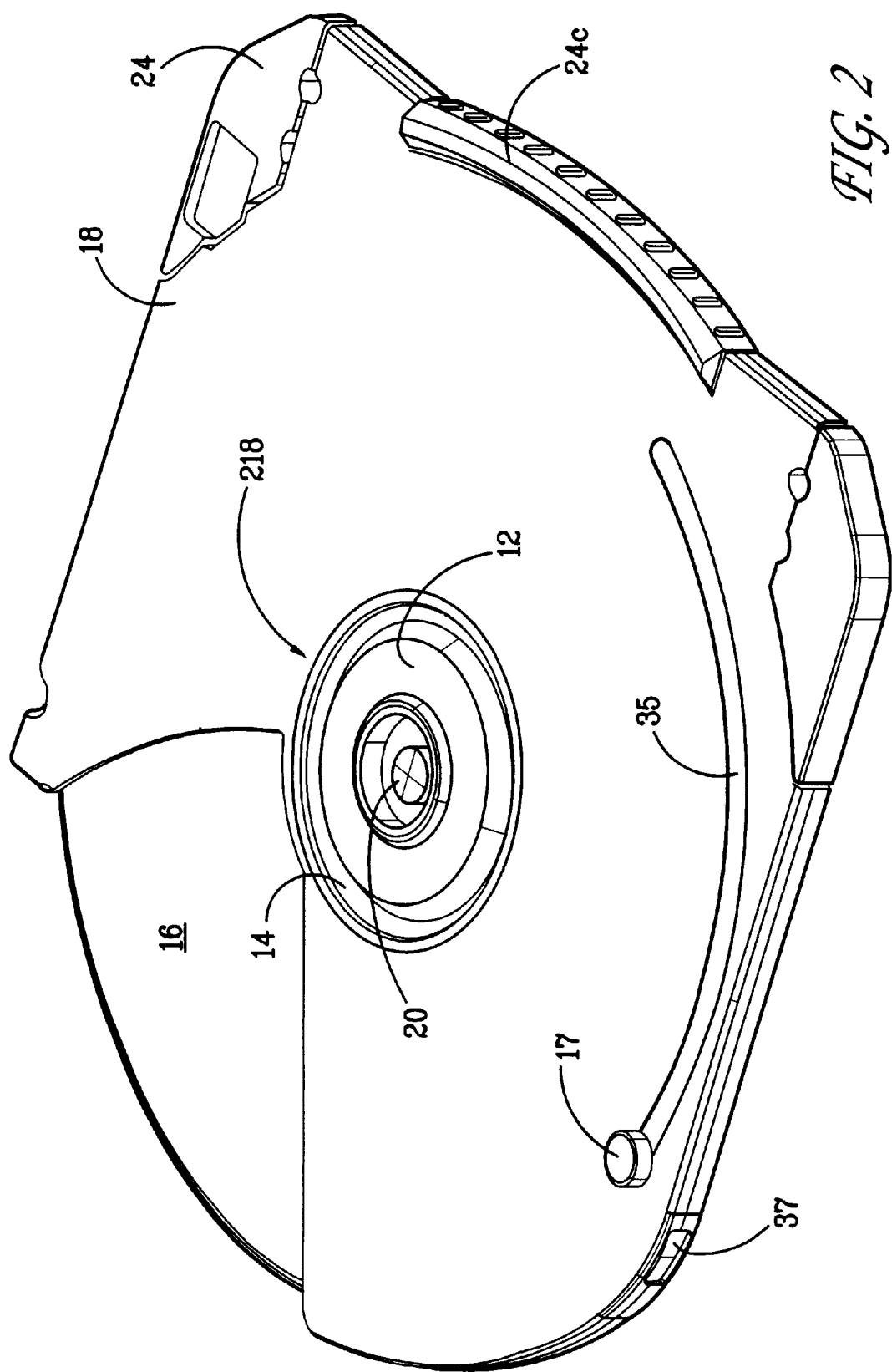
FIG. 2 is an isometric view of a cartridge for use with the drive of FIG. 1.
Figure 4:
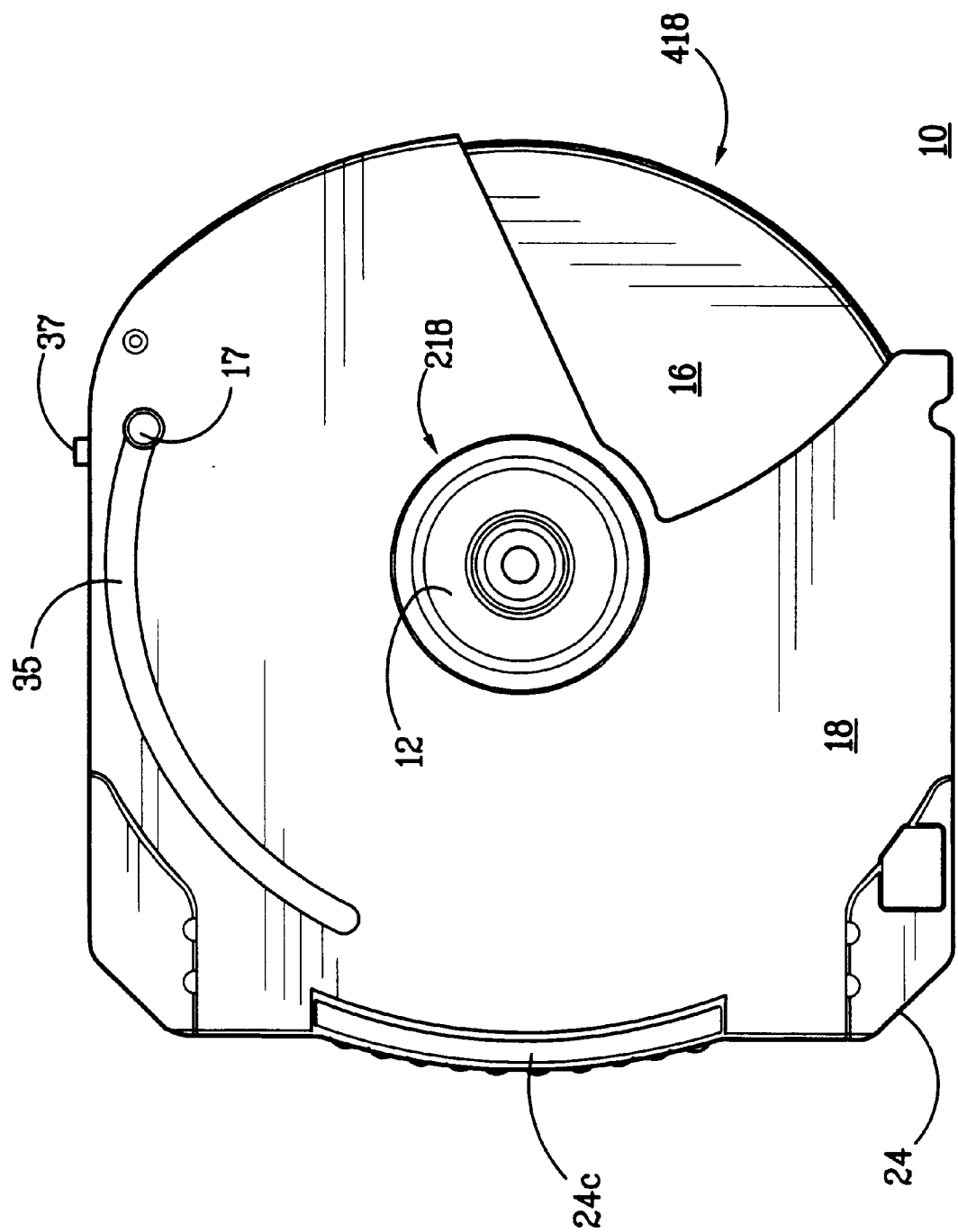
FIG. 4 is a bottom plan view of the cartridge of FIG. 2.

FIG. 1 is a top view of a disk drive 50 with its top cover removed for clarity. Drive 50 accepts a removable disk cartridge 10 (shown in phantom) for reading and storing digital information. Drive 50 comprises a chassis 57, an actuator 56, including an opposing pair of load beams 44 having a read/write head 54 disposed at the end of each load beam, a load ramp 47, a spindle motor 53 and a spindle 40. A disk cartridge 10 can be inserted into the front of the drive in the direction indicated by the arrow. During insertion, cartridge 10 slides linearly along the top surface of chassis 57 and spindle motor 53 for engagement with the read/write heads 54.

FIGS. 2–5 are isometric, top plan, bottom plan, and side elevation views of a disk cartridge 10 that embodies aspects of the present invention. Disk cartridge 10 has a number of differences from a full-size cartridges, such as the well-known 1.44 megabyte 3.5" floppy disk cartridge and the well-known ZIP disk cartridge. A large wedge-shaped disk access opening 418 is disposed in the front portion of disk cartridge 10 to provide selective access to the media of cartridge 10. Disk cartridge 10 comprises a flexible magnetic disk 14 (partially shown in FIG. 2) and a disk media hub 12. A driving access hole 218 provides an opening in cartridge 10 for drive spindle 40 (see FIG. 1) to engage hub 12 and drive flexible disk 14 over opposing read/write heads 54 (also shown in FIG. 1). Hub 12 is sized slightly smaller than driving access hole 218, and as best shown in FIG. 5, hub 12 projects downwardly from cartridge 10. Disk cartridge 10 also comprises a projection 17 that travels along projection track 35 of cartridge 10.

Figure 6:
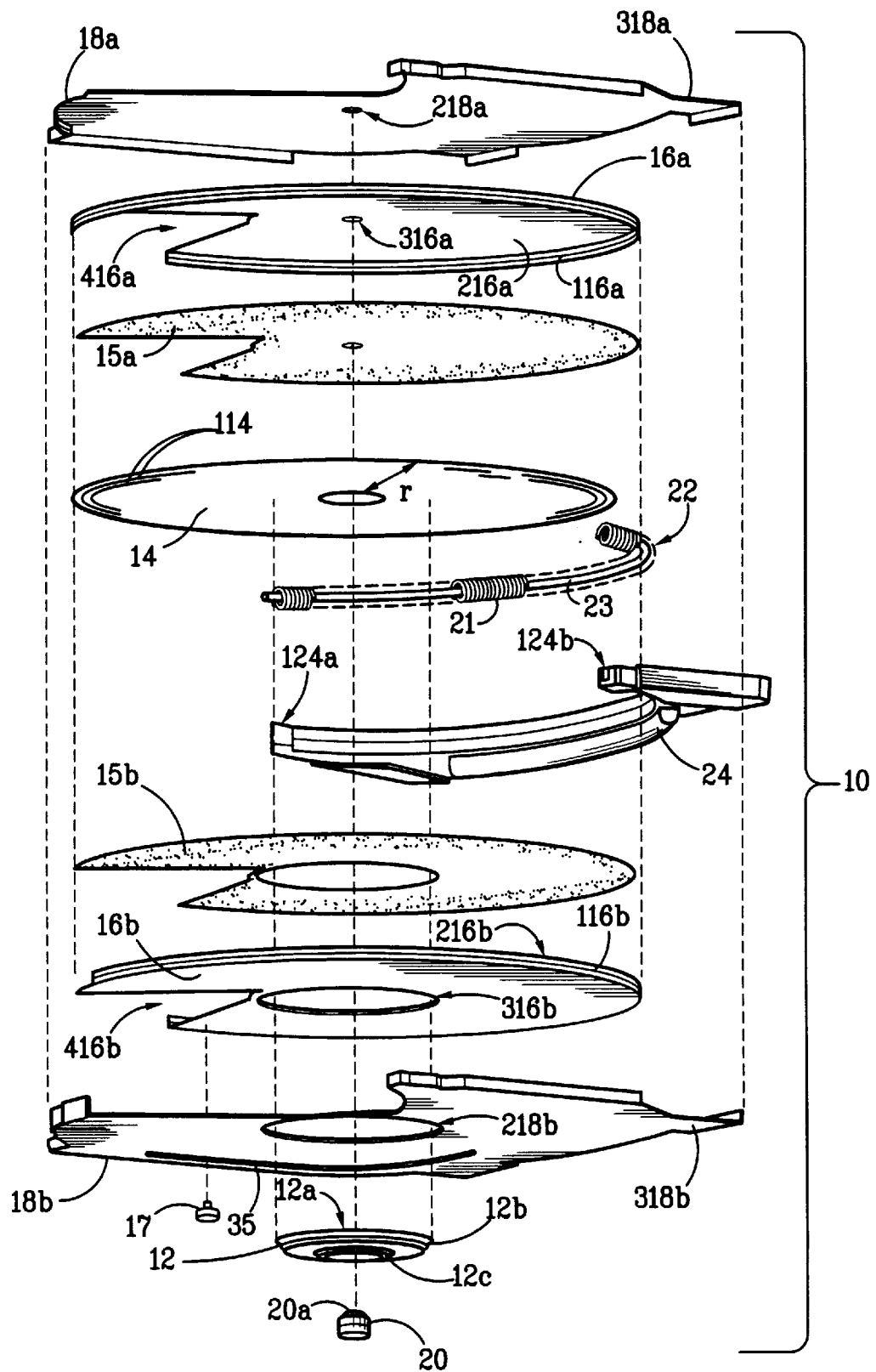
FIG. 6 is an exploded view of the cartridge of FIG. 2.

Referring also to FIG. 6, an exploded view of cartridge 10 is provided to more clearly show cartridge 10 interior components. Cartridge 10 comprises top and bottom cartridge shell halves 18a and 18b, respectively, a rotary shutter shell having upper and lower halves 16a and 16b, respectively, upper and lower shutter shell liners 15a and 15b, respectively, a shutter pivot post 20, a shutter spring mechanism 22, and a shell stabilizer 24. Projection 17 is coupled to bottom shell half 18b.

Liners 15a and 15b are attached to shutter shell halves 16a and 16b. Liner 15a is attached to inside surface 216a of shutter shell half 16a; whereas liner 15b is attached to inside surface 216b of shutter shell half 16b. Disk media 14 rotates within the shutter shell and not directly within the cartridge shell. Accordingly, unlike other known cartridges wherein the liners are typically attached to the inside of the cartridge shell, liners 15a, 15b are attached to the inside surface of shutter shells 16a, 16b. Liners 15a and 15b are preferably attached via an adhesive, more preferably a pressure sensitive adhesive. Liners 15a and 15b are cut to the shape of the surface to which they will be attached (i.e., 216a, 216b) from a sheet of liner material. The liner material is preferably 100% polyester, more preferably Veratec 141–620 available from Data Resources Group in Walpole Mass. The liner material has a thickness preferably in the range of about 3.35 mils to about 3.8 mils, more preferably about 3.35 mils.

Stabilizer 24 is a substantially U-shaped spacer positioned in the rear portion of cartridge 10 and between upper and lower cartridge shell halves 18a and 18b. Rear cartridge shell tabs 318a and 318b extend rearwardly from upper and lower shell halves 18a and 18b and wrap around stabilizer 24. Therefore, when cartridge 10 is assembled, a portion of stabilizer 24 extends into and between the shell halves 18a and 18b and portions of stabilizer 24 protrude from joined upper and lower shell halves 18a and 18b. The protruding portions of stabilizer 24 form portions of the outer contours of cartridge 10. In particular, stabilizer 24 forms cartridge rear corners 24a and 24b and forms rear portion 24c.

Stabilizer 24 is formed of a lightweight rigid material such as plastic. More preferably, stabilizer 24 is formed of high impact polystyrene. It is formed from any one of the well-known plastic forming processes, such as injection molding. Stabilizer 24 provides dimensional stability and rigidity to cartridge 10, thereby minimizing cartridge deformation during mishandling, twisting, and so on.

Shutter spring mechanism 22 comprises a guide wire 23 and a round helical compression spring 21 that is slid over guidewire 23. Shutter spring mechanism 22 is fixed to stabilizer 24 at the ends of guide wire 23. The ends seat in channels 124a and 124b that are formed into the ends of U-shaped stabilizer 24.

Flexible magnetic disk 14 is formed of a thin polymer film, such as MYLAR, and has a thin magnetic layer uniformly dispersed on the top and bottom surfaces thereof. The magnetic layer makes the flexible disk 14 susceptible to magnetic flux and enables the storage of digital data when the disk surface is brought into magnetic communication with a magnetic transducer of the type commonly found in disk drives.

Disk 14 is generally circular with a circular hole proximate the center of disk 14. Disk 14 has a radius r in a range of about 20 to 25 mm, and preferably about 23.25 mm. Disk 14 has concentric tracks 114 that provide the formatting of disk 14 to store digital information.

Media hub 12 is essentially donut shaped and comprises a ferrous material such as steel, preferably stainless steel. Hub 12 comprises a bore or hole 12a proximate the center, peripheral outer edge 12b and inner ring surface 12c. Inner ring 12c has an outer angled edge and a substantially flat bottom surface. Outer peripheral edge 12b is also angled. Media hub 12 is firmly secured to disk 14 such that the center of hub 12 is aligned proximate the center of disk 14. Media hub 12 is preferably attached to disk 14 via a well-known adhesive process. The disk and hub assembly are rotatably disposed between upper and lower cartridge shutter shell halves 16a, 16b. Hub 12 is disposed in spindle access hole 316b of lower shutter shell 16b and spindle access hole 218b of lower cartridge shell 18b. As described in further detail below, the protrusion of hub 12 from shutter shell 16 and an cartridge shell 18 enhances coupling to a rotational power source, such as that provided by a drive spindle, when cartridge 10 is within drive 50 and acts a restraint on lateral movement of disk 14 when the cartridge is removed drive 50.

Figure 7:
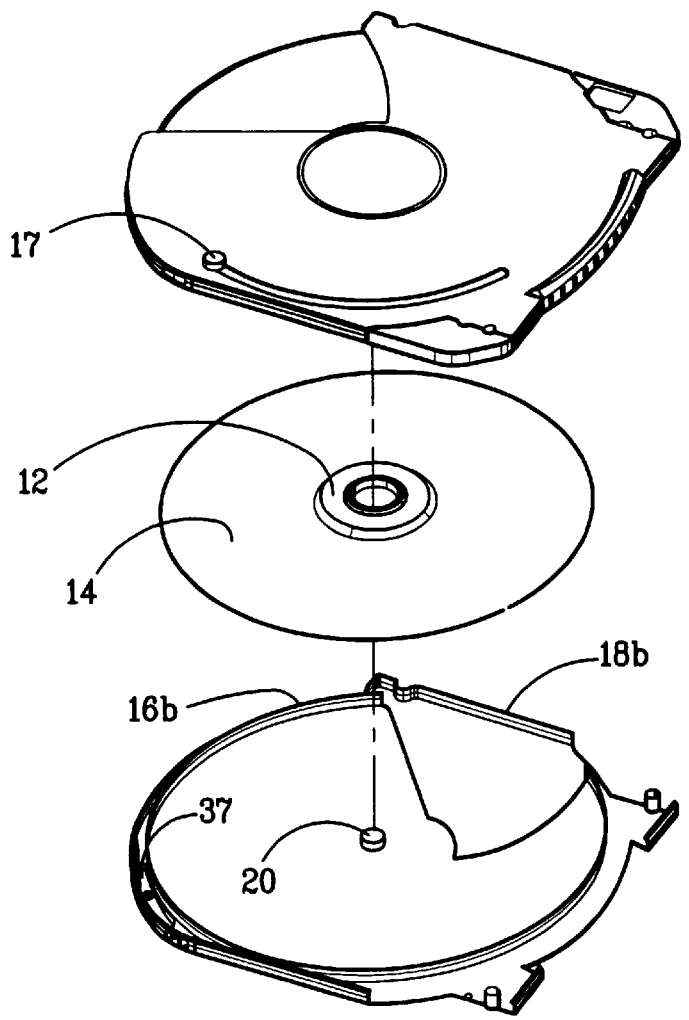
FIG. 7 is a partially exploded view of the cartridge of FIG. 2 showing a shutter latching mechanism.

As shown by FIGS. 6 and 7, shutter halves 16a and 16b fit together such that edge 116a of upper shell half 16a fits within edge 116b of lower shell half 16b to form shutter shell 16, which houses media 14 and shutter liners 15a and 15b (not shown in FIG. 5) which are attached to the inner surfaces of shutter shells 16a and 16b respectively. The complete shutter assembly is pivotally attached to top shell 18a. Hub 12 is attached to media 14 and protrudes through drive access hole 316b in shutter shell 16b. Accordingly, when cartridge 10 is inserted and operating in drive 50, media 14 rotates within shutter shell 16. Pivot post 20 attaches shutter assembly 28 to upper shell half 18a by attaching the top portion 20a to pivot hole 218b via shutter pivot hole 316a. Pivot post 20 is fixedly attached to top shell cartridge 18a while leaving an offset space between and around post portion 20a and shutter pivot hole 316a.

When the shutter assembly is complete, media 14 is exposed at media access opening 416a, 416b. However, media 14 within cartridge 10 is only accessible from outside of cartridge 10 when shutter access opening 416a, 416b aligns with cartridge shell access opening 418. In such an alignment, shutter shell 16 moves to a first position so that the openings 416a, 416b, 418 completely overlap thereby "opening" cartridge 10. When the cartridge shell access opening 416a, 416b and cartridge shell access opening 418 are misaligned, shutter shell 16 moves to a second position such that the openings 416a, 416b, 418 do not over lap thereby "closing" cartridge 10, shielding media 14 from ambient contaminants.

Significantly, cartridge 10 employs a projection 17 to accommodate the opening of shutter 16 during insertion of cartridge 10 into drive 50. In essence, the projection operates by impinging upon the cartridge insertion opening of drive 50 as cartridge 10 is inserted into drive 50. Because projection 17 extends beyond the general thickness of cartridge 10, projection 17 cannot fit through the narrow drive opening. Accordingly, as a cartridge 10 is forced into drive 50, projection 17 impinges on the frame of drive 50 and thereby drags shutter 16 to an open position.

As noted above, projection 17 is coupled to shutter shell 16. Projection 17 could be formed integrally into shutter 16 but is preferably attached to shutter shell 16 as a separate part such as by welding. Preferably projection 17 forms a substantially round cross-section and is formed of a material such as metal to provide wear resistance. Projection 17 extends downwardly from shutter shell 16 so as to extend through cartridge shell 18 and projection track 35, which is cut into shell 18. When cartridge 10 is in the closed position, compression spring 21 biases shutter 16 toward the closed position and moves projection 17 to the forward most position in projection track 35, as shown for example in FIG. 2. To open cartridge 10, a counterclockwise rotational force is applied to shutter shell 16 (from the bottom cartridge perspective of FIG. 2) against the bias of spring 21, thereby compressing spring 21. Accordingly, projection 17 is travels to the rearmost portion of projection track 35, thereby opening shutter 16.

Figure 7A:
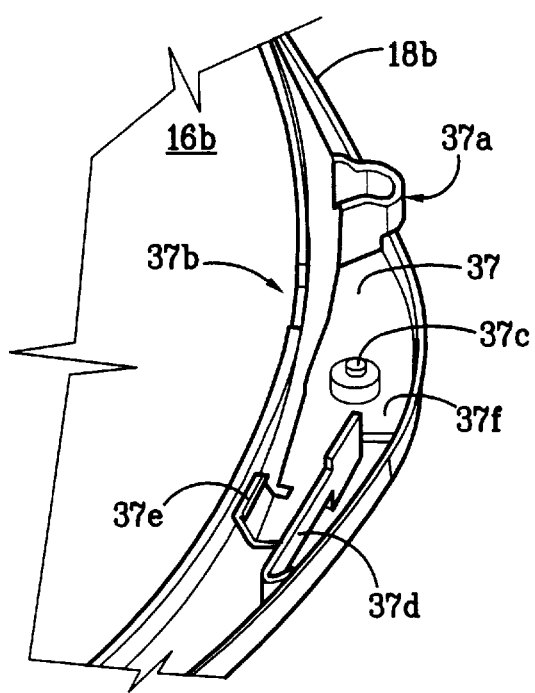
FIG. 7A is a detailed view of a the latch area of FIG. 7.

Referring more particularly to FIGS. 7 and 7A, the operation of shutter latch 37 is illustrated. Essentially, as with projection 17, shutter latch 37 operates passively, i.e., without moving parts on drive 50. Shutter latch 37 is also sized larger than the width of cartridge 10 so that it extends outwardly from the edge of cartridge 10. Accordingly, when a cartridge 10 is inserted into drive 50, latch 37 impinges upon the drive opening and is compressed thereby. In order for cartridge 10 to fit through the opening an into drive 50, latch 37 is pinched an the latch is release.

FIG. 7 shows an exploded view of cartridge 10 that exposes shutter latch 37. FIG. 7A shows a detailed view of a portion of cartridge 10 including shutter latch 37. Shutter latch 37 comprises a main lever body 37f. Coupled to the body are actuating point 37a, pivot 37c, spring 37d and tab 37e. Shutter bottom 16b has a cut-out 37b that accommodates tab 37e. When shutter 16 is in the closed position, tab 37e engages shutter cut-out 37b and thereby latches shutter 16 to prevent rotation. On the other hand, when actuating point 37a is depressed, such as by inserting cartridge 10 into drive 50, lever 37f is forced to pivot about pivot 37c. Accordingly, the pivot movement of latch 37 causes tab 37e to move out of cut-out 37b thereby releasing shutter 16 from latch 37. Spring 37d causes lever 37f to pivot back when the pressure is removed from actuating point 37a. Accordingly, when cut-out 37b is aligned with tab 37e, spring 37d biases tab 37e into cutout 37b.

Referring to FIGS. 8A–8F, the operation of shutter shell 16 with drive 50 is further illustrated. In general, as cartridge 10 is inserted into drive 50, latch actuating point 37a impinges on the side rails 51 of drive 50. The impingement causes the tab of latch 37 release from shutter 16 thereby freeing the shutter to rotate. Somewhat simultaneously, projection 17 impinges on the opening of drive 50 proximate the stepped portion 50b. As cartridge 10 is urged further into drive 50, projection 17 moves along projection track 35 with respect to the cartridge and along the face of step 50b with respect to drive 50. Accordingly, shutter 16 is opened for drive access to media 14 of cartridge 10.

Referring to FIGS. 8A and 8B, a top and bottom plan view of cartridge 10 and drive 50 are shown with cartridge 10 partially inserted into drive 50. The top shell 18a has been removed to further illustrate the operation of latch 37. Furthermore, in FIGS. 8A and 8B, cartridge 10 is inserted into drive 50 just to the point that actuating point 37a is proximate the front of drive 50. As the cartridge is inserted further into drive 50, actuating point 37a engages side rail 51 of drive 50, thereby unlatching shutter shell 16 and allowing it to rotate freely. The front frame 50a of drive 50 has a stepped portion 50b so that projection 17 has not yet engaged the front frame 50a.

Referring next to FIGS. 8C and 8D, top and bottom plan views further illustrate the operation of shutter 16 in a more fully inserted position. In these Figures, projection 17 has engaged the front frame 50a proximate the stepped portion 50b. As cartridge 10 is urged further into drive 50, frame front 50a urges projection 17 to rotate shutter 16 toward the open position. Consequently, projection 17 slides across the stepped portion 50b in the direction of arrow A (FIG. 8D) as cartridge 10 further enters drive 50.

Figure 8E:
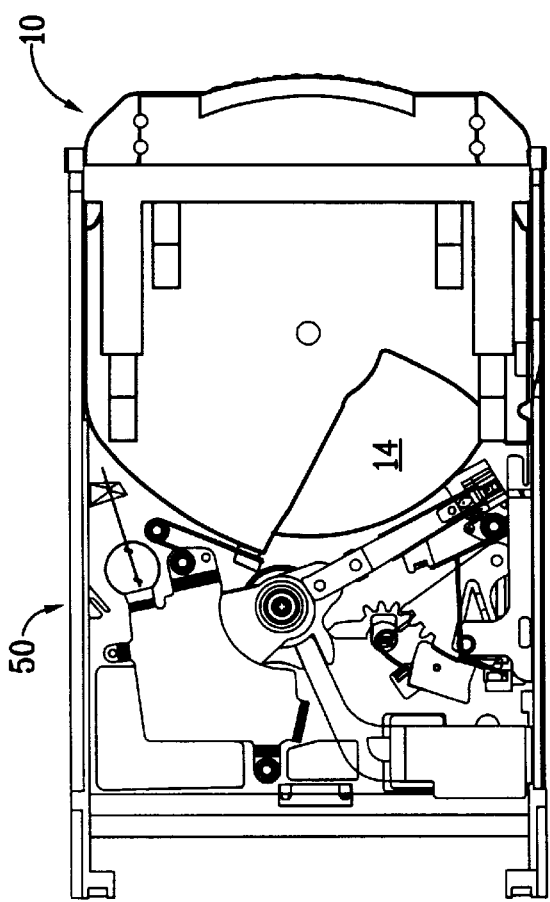
Figure 8F:
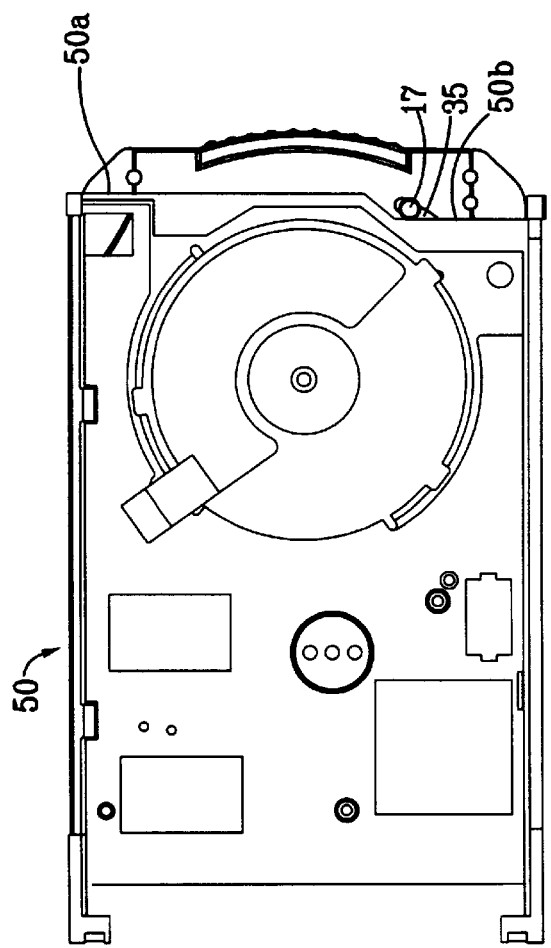

Finally, as illustrated in top and bottom plan views of FIGS. 8E and 8F, as cartridge 10 is urged fully into drive 50, projection 17 has moved rearwardly in projection track 35 and across the stepped portion 50b of front frame 50a. Consequently, shutter 16 is rotated to the fully open position and is ready for the loading of the read/write heads.

The operation of shutter 16 during cartridge ejection is essentially the reverse sequence from that described above in connection with FIGS. 8A–8F. However, the ejection of cartridge 10 from drive 11 is aided by spring 21 of cartridge 10. In particular, as cartridge 10 ejects from drive 50, the force of spring 21 rotates shutter 16 in the clockwise direction. The force of spring 21 causes projection 17 to impinge upon the front frame 50a. This force also causes cartridge 10 to move outwardly from drive 50. Of course, this force to move the cartridge outwardly diminishes as it moves outwardly from drive 50. When the cartridge moves proximately out of drive 50, shutter 16 is rotated to the closed position. At this moment, latch 37 latches shutter 16 to the closed position as actuating point 37a clears drive rails 51.

The above description of preferred embodiments is not intended to impliedly limit the scope of protection of the following claims. Thus, for example, except where they are expressly so limited, the following claims are not limited to applications involving cartridges for disk drive systems.

What is claimed is:

1. A cartridge for use in a disk drive, said cartridge comprising:

an outer shell having top and bottom portions with substantially planar main surfaces, said bottom portion having a substantially circular center opening therethrough;

a flexible disk disposed within said outer shell, said outer shell having an access opening providing read/write access to a top surface and a bottom surface of said flexible disk;

a shutter rotatably coupled to said outer shell and rotatable about said center opening between a first position wherein said shutter covers said access opening and a second position wherein said shutter exposes said access opening; and a projection projecting outwardly through one of the substantially planar main surfaces of the outer shell and coupled to said shutter, said projection adapted to impinge upon a portion of said disk drive during insertion of said cartridge therein and thereby rotate said shutter.

2. The cartridge as recited in claim 1 wherein said projection moves with said shutter from the first position wherein the shutter is proximate a front portion of said cartridge to the second position wherein the shutter is proximate a rear portion of said cartridge.

3. The cartridge as recited in claim 1 wherein said projection projects through said bottom portion of said outer shell.

4. The cartridge as recited in claim 3 wherein said outer shell comprises a track opening therethrough in which said projection is disposed.

5. The cartridge as recited in claim 4 wherein said track opening comprises an arcuate path.

6. The cartridge as recited in claim 1 wherein said flexible disk has a radius in a range of about 20 millimeters to 25 millimeters.

7. The cartridge of claim 1 wherein said cartridge comprises a latch to prevent said shutter from moving unless said latch is released.

8. The cartridge as recited in claim 7 wherein said latch is disposed proximate a side peripheral edge of said cartridge.

9. The cartridge as recited in claim 8 wherein said latch is disposed proximate a front portion of said cartridge.

10. A data storage cartridge for use in a storage device, comprising:

an outer shell having substantially planar main surfaces and an access opening formed therein;

a storage medium rotatably disposed within said outer shell and accessible by way of said access opening;

a rotatable shutter, said shutter rotating about a center axis substantially in alignment with a center axis of said storage medium and relative to said outer shell between a first position covering said access opening and a second position opening said access opening; and a projection fixed to said rotatable shutter and projecting outward through one of the substantially planar main surfaces of the outer shell, said projection adapted to engage a stationary portion of said storage device such that said projection causes said rotatable shutter to rotate to said second position as the cartridge is inserted into the storage device.

11. The data storage cartridge as recited in claim 10 wherein said projection comprises a rounded end portion.

12. The data storage cartridge as recited in claim 10 wherein said rotatable shutter comprises a shutter shell.

13. The data storage cartridge as recited in claim 12 wherein said shutter shell envelops said storage medium.

14. The data storage cartridge as recited in claim 10 wherein said projection is coupled to a bottom of said rotatable shutter.

15. The data storage cartridge as recited in claim 10 wherein said projection projects downwardly through a bottom surface of said data storage cartridge.

* * * * *

UNITED STATES PATENT AND TRADEMARK OFFICE
CERTIFICATE OF CORRECTION

PATENT NO. : 5,995,346
DATED : November 30, 1999
INVENTOR(S) : Brian Schick and Douglas Mayne It is certified that error appears in the above-identified patent and that said Letters Patent is hereby corrected as shown below:

Title page, item [57],
Abstract, Line 7, "a" at the end of the line should be -the-.

Col. 3, line 60, "comers" should be -corners-.

Signed and Sealed this

Fourteenth Day of November, 2000

Attest:

Q. TODD DICKINSON

*Attesting Officer*      *Director of Patents and Trademarks*